Figure 1:
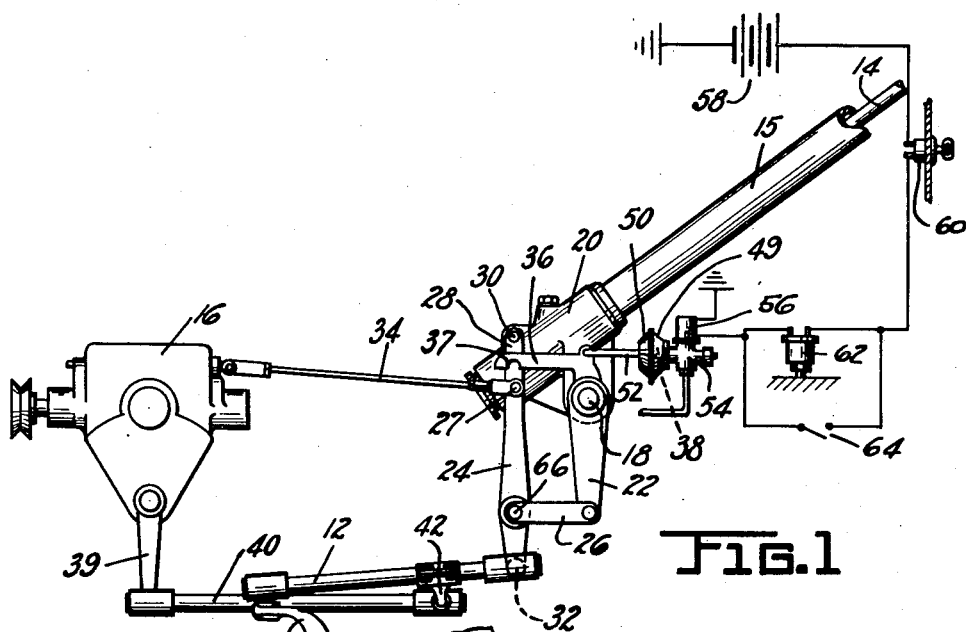

June 19, 1951   H. W. PRICE   2,557,796
POWER STEERING MECHANISM
Filed Dec. 13, 1945

INVENTOR.
HAROLD W. PRICE
BY H. O. Clayton
ATTORNEY

Patented June 19, 1951

2,557,796

UNITED STATES PATENT OFFICE 2,557,796

POWER STEERING MECHANISM

Harold W. Price, Bradenton, Fla., assignor to Bendix Aviation Corporation, South Bend, Ind., a corporation of Delaware Application December 13, 1945, Serial No. 634,852

3 Claims. (Cl. 180—79.2)

This invention relates to mechanism for operating the steering mechanism of an automotive vehicle and one of the important objects of the invention is to provide an easily controlled power and manually operated means, operable when the vehicle is at a standstill or is travelling below a certain speed, for effecting the steering operation unaided by the physical effort of the driver or for contributing a part of the force necessary to effect said operation the remainder of the force being supplied by the physical effort of the driver.

Yet another object of the invention is to provide a double-acting hydraulic motor unit constituting one of the principal parts of a steering mechanism of an automotive vehicle said motor unit being controlled by a manually operated mechanism which is operative only when the vehicle is at rest or is travelling below a certain speed.

A further object of my invention is to provide power means constituting part of the steering mechanism of an automotive vehicle the operation of said power means being in part controlled by a so-called follow-up control means and in part by a motor which in turn is controlled by a vehicle speed responsive governor.

Yet another object of my invention is to provide steering mechanism for an automotive vehicle, said mechanism including force transmitting means interconnecting a drag link of the steering mechanism, the control means of a power means, and the steering wheel of the vehicle, the parts of said force transmitting means being so constructed and arranged and so operative that the drag link is operated solely by the physical effort of the driver or solely by the aforementioned power means or as a result of the combined effects of the latter two means.

A further object of the invention is to provide a mechanism for operating the steering wheels of an automotive vehicle, said mechanism comprising force transmitting means interconnecting the drag link of the mechanism, the steering wheel of the vehicle and means for controlling the operation of a double-acting fluid motor operably connected to said drag link, said force transmitting means being in part controlled by power operated means to either condition the force transmitting means to make possible an operation of the steering wheels solely by the physical effort of the driver or to condition the force transmitting means to make possible an operation of the steering wheels solely by the operation of the aforementioned fluid motor or by the combined operation of said motor and the physical effort of the driver.

Another object of my invention is to provide a simple yet efficient and effective double-acting fluid motor unit which may be employed as a part of the steering mechanism of an automotive vehicle.

Figures 2, 3:
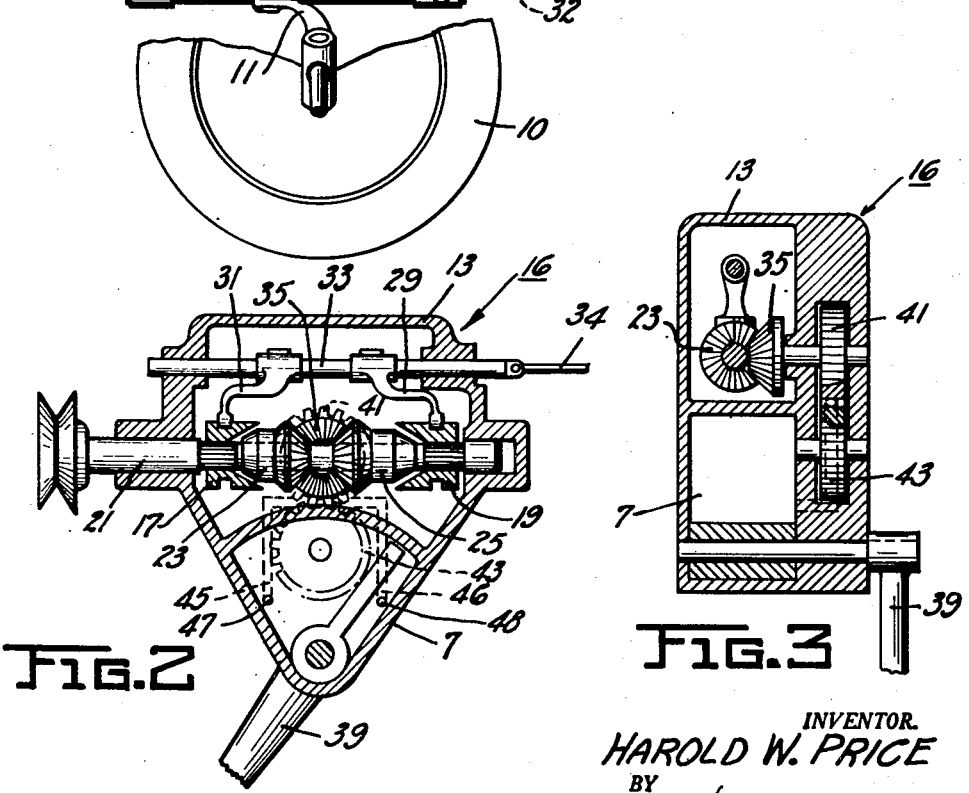

Other objects and features of my invention will become apparent to those skilled in the art from the following description taken in conjunction with the drawings, in which:

Figure 1 is a diagrammatic view disclosing the principal features of the steering mechanism constituting my invention; and Figures 2 and 3 are sectional views disclosing details of the fluid motor unit constituting an important part of the mechanism of my invention.

Referring now to the three figures of the drawing which disclose a preferred embodiment of my invention, one of the two interconnected dirigible wheels of an automotive vehicle is indicated by the reference numeral 10 and said wheel is actuated by a steering arm 11 which is in turn actuated by a drag link 12. Now this part of the steering mechanism is, of course, of standard design, accordingly, no claim is made thereto.

My invention is directed to the steering mechanism interconnecting a steering wheel operated shaft 14 and the drag link 12 said mechanism including a double-acting fluid motor unit 16, means for controlling said unit, and force transmitting means interconnecting the shaft 14, unit 16, the control means and the drag link; and this mechanism is selectively operative to (1) actuate the dirigible wheels of the vehicle solely by the physical effort of the driver when he rotates the steering wheel, (2) actuate said dirigible wheels solely by the power means of the mechanism, that is the motor unit 16, and (3) actuate said dirigible wheels by the combined effort of the motor unit 16 and the physical effort of the driver.

Describing now a part of the aforementioned force transmitting means said means includes a shaft 18 which is rotated in one direction or the other by means of the usual gearing 20 mounted at the base of the steering post 15, said gearing being actuated by the shaft 14. A crank 22 non-rotatably mounted on the shaft 18 is connected to a floating lever 24 by means of a connecting link 26 and said lever is pivotally connected at its upper end to a pin 27 extending from the lower end of a supporting strap 28. The latter member is pivotally mounted upon a pin 30 extending from the casing of the gear mechanism 20. The lower end of the floating lever 24 is pivotally connected at 32 to the drag link 12.

Describing now an important feature of my invention, that is the motor unit 16 for operating the drag link, said unit is disclosed in detail in Figures 2 and 3 and includes a casing 13 housing a double-acting hydraulic vane motor 7 and clutch mechanism, including clutch members 17 and 19, constituting means for controlling the operation of said motor unit. The members 17 and 19 are slidably and drivably mounted on an engine driven drive shaft 21 which is journalled in the casing 13; and said clutch members are moved along the shaft 21, to selectively engage one or the other of driving pinions 23 and 25, by arms 29 and 31, respectively, said arms being fixedly secured to a shaft 33 which is connected to a link 34; and as is disclosed in Figure 1 the link 34 is pivotally connected to the pin 27.

The pinions 23 and 25, which are non-rotatably mounted on the drive shaft 21, are in mesh with a driving gear 35 which serves to actuate a gear pump comprising meshed gears 41 and 43; and the power fluid of said pump preferably oil, flows through ducts 45, 46, 47 and 48 from said gear pump to the motor unit 21 the direction of rotation of the pump determining the direction of rotation of the vane member 39, Figure 2. The gear pump and motor 7 are completely filled with the aforementioned power fluid to provide a closed system and it follows from the above description that the vane member 39 of the motor 7 is rotated clockwise or counterclockwise depending upon the operation of the above described clutch control mechanism 17, 19. As disclosed in Figure 2, the vane 39 is extended to provide a crank pitman arm 39' which is operably connected, by a link 40 and a connection 42, to the drag link 12.

Describing now one of the most important features of my invention, there is provided power means for cutting out the operation of the above described motor unit 16 either at the will of the driver or when the vehicle is travelling at or above a certain speed. One arm of a bell crank lever 36 rotatably mounted on the shaft 18 is notched at 37 to fit over the pin 27; and said lever is biased to rotate in a counterclockwise direction by a spring 38 housed within the compartment 49 of a spring and pressure differential operated motor 50. It follows therefore that the spring 38 serves to move the notched portion 37 over the pin 27 to thereby render said pin immobile. Now the spring 38 acts upon the power element, not shown, of the motor 50, said power element being connected to the lever 36 by a link 52.

The motor 50 is controlled by a three-way valve 54 which is operated by a spring, not shown, and a grounded solenoid 56. When the solenoid is energized the valve is operated to connect the motor compartment 49 with a source of vacuum, preferably the intake manifold of the engine of the vehicle; and when the solenoid is deenergized the aforementioned valve spring serves to close the valve to vent the motor compartment 49 to atmosphere thereby permitting the spring 38 to expand to rotate the lever 36 counterclockwise and lock the upper end of the lever 24. The grounded solenoid 56 is wired in series with a grounded battery 58, the ignition switch 60 of the car and a switch 62 which is operated by a vehicle speed responsive governor, not shown; and if desired there may be included in the electrical mechanism a switch 64 operated by the driver of the vehicle. The latter switch is wired in parallel with the governor operated switch 62, accordingly, it follows that the solenoid 56 may be energized, to effect a vacuum energization of the motor 50, by the operation of either the switch 62 or the switch 64.

Describing now the operation of the mechanism of my invention when the vehicle is at a standstill or is travelling below a certain speed, say 15 M. P. H., the switch 62 is automatically closed thereby effecting a vacuum operation of the motor 50 to lift the lever 36 to the position disclosed in Figure 1. The lever 24 is then free to fulcrum at either the pivotal connection 32 or the pivotal connection between the link 26 and said lever, said latter connection being indicated by the reference numeral 66.

To effect a steering movement of the front wheels the driver rotates the steering wheel and said operation serves, by virtue of the resistance to movement of the drag link 12, to effect a rotation of the lever 24 about the pivotal connection 32; and this operation effects an operation of the clutch mechanism 17, 19 to cut in the operation of the motor unit 16. The drag link 12 is thus power operated to effect a steering operation of the wheels 10. If the driver should arrest the movement of the steering wheel after the clutch mechanism has been operated and before the steering movement is completed, then the lever 24 will rotate about the pivot 66 as a fulcrum to thereby operate the clutch mechanism to cut off the operation of the motor unit; and this operation is defined in the art as a follow-up control of the power means. The driver may then resume the operation of the power means by resuming the rotation of the steering wheel to again operate the clutch mechanism to again energize the motor unit. With the aforementioned rotation of the steering wheel if the resistance to movement of the rod 34, by virtue of the frictional resistance to movement offered by either the clutch 17 or the clutch 19 and the shaft 33, is greater than the resistance to movement offered by the drag link 12, then the steering mechanism is manually operated before it is power operated; and if the two aforementioned resistances are equal, the rotation of the steering wheel serves to simultaneously or substantially simultaneously effect a power and manual operation of the steering mechanism of the vehicle. It is to be noted here that the driver may effect a combined, that is, concurrent power and manual operation of the steering mechanism by (1) continuing the rotation of the steering wheel once the same is operated to initiate the operation of the motor unit, and (2) in this operation exerting a force sufficient to keep the clutch mechanism in tight engagement and add a manual load to the then existing power load upon the drag link. If the driver wishes to operate the steering mechanism solely by the power means he effects this result by limiting the force applied to the steering wheel to a factor sufficient to operate the aforementioned clutch mechanism. If the power means should fail for any reason then the drag link is actuated solely by the physical effort of the driver; for with this operation the lever 24 will fulcrum at the point 27.

Speaking of the operation of the mechanism solely by the physical effort of the driver this operation is, of course, inherent in the mechanism of my invention; for above governor speed, which as stated above may be set at 15 M. P. H., the motor 50 is spring energized to actuate the locking lever 36; and when said lever is moved to its locked position then the lever 24 can fulcrum only at the point 27 or in other words the steering mechanism can only be operated by the physical effort of the driver. This operation is, of course, desirable inasmuch as under normal conditions there is no need for a power operation of the steering wheels of a vehicle when the same is travelling above the aforementioned governor speed.

There is thus provided a simple yet efficient and effective mechanism for effecting the steering wheels of an automotive vehicle; for with the mechanism of my invention the driver may operate said wheels in any one of four different ways, that is (1) solely by the physical effort of the driver, (2) by the physical effort of the driver aided by power means, (3) solely by the operation of the power means, and (4) by a follow-up operation of the power means, that is, the operation resulting from a plurality of partial movements of the steering wheel.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment.

I claim:

1. Manually and/or power operated steering mechanism adapted to operate the dirigible wheels of an automotive vehicle including a drag link, a motor, a pitman arm connected to the power element of the motor, a steering crank arm, means for controlling the operation of the motor, force transmitting means interconnecting the pitman with the drag link, other force transmitting means, including a floating lever member, interconnecting the drag link, the control means, the steering crank arm and the pitman arm, and power means operated and adapted to engage the floating lever adjacent its connection with the motor control means to provide a predetermined fulcrum for said floating lever whereby to effect manual steering.

2. Manually and/or power operated mechanism adapted to effect the steering operation of the dirigible wheels of an automotive vehicle including a pitman arm, a drag link, a double acting motor for operating the drag link, control means for the motor, force transmitting means, including a floating lever, interconnecting the control means and drag link, said lever being constructed and arranged to effect a power operation of the mechanism, a manual operation of the mechanism, or a combined manual and power operation of the mechanism; a second force transmitting means interconnecting the pitman arm and floating lever, a third force transmitting means including a portion of said second force means interconnecting the motor and drag link, and power means operable to position the floating lever and the control means, when the vehicle is traveling at or above a certain speed, to cut out operation of the motor, whereby the operation of the steering mechanism then being effected solely by the physical effort of the driver.

3. Manually and/or power operated mechanism adapted to operate the dirigible wheels of an automotive vehicle including a drag link, a pitman arm, a motor, a steering crank arm, means for controlling the operation of the motor, force transmitting means interconnecting the motor and drag link, other force transmitting means including the steering arm and a floating lever interconnecting the pitman arm, the drag link and the motor control means and operative, with an operation of the steering crank arm, to actuate first the control means or the drag link depending upon the degree of force necessary to effect said steering operations or to actuate the control means and drag link simultaneously; together with means, operative at or above a certain factor of speed of the vehicle, to position said motor control means, for rendering the steering mechanism incapable of power operation, the operation of the mechanism then being a manual one.

HAROLD W. PRICE.

REFERENCES CITED

The following references are of record in the file of this patent:

UNITED STATES PATENTS

| Number | Name | Date |
|--------|------|------|
| 2,020,951 | Lemon | Nov. 12, 1935 |
| 2,069,540 | Sanford | Feb. 2, 1937 |
| 2,341,502 | Ingres | Feb. 8, 1944 |
| 2,356,492 | Smith | Aug. 22, 1944 |
| 2,429,185 | Hukill | Oct. 14, 1947 |